United States Patent
Gupta et al.

(10) Patent No.: US 11,252,138 B2
(45) Date of Patent: Feb. 15, 2022

(54) REDUNDANT DEVICE LOCKING KEY MANAGEMENT SYSTEM

(71) Applicant: Dell Products L.P., Round Rock, TX (US)

(72) Inventors: Chitrak Gupta, Karnataka (IN); Shinose Abdul Rahiman, Bangalore (IN); Sushma Basavarajaiah, Bangalore (IN); Mukund P. Khatri, Austin, TX (US); Elie Antoun Jreij, Pflugerville, TX (US); Rama Rao Bisa, Sobha (IN); Kala Sampathkumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 375 days.

(21) Appl. No.: 16/256,792

(22) Filed: Jan. 24, 2019

(65) Prior Publication Data

US 2020/0244632 A1    Jul. 30, 2020

(51) Int. Cl.
   *H04L 29/06*    (2006.01)
   *H04L 9/06*    (2006.01)
   (Continued)

(52) U.S. Cl.
   CPC ............ *H04L 63/06* (2013.01); *H04L 9/0637* (2013.01); *H04L 9/12* (2013.01); *H04W 12/30* (2021.01)

(58) Field of Classification Search
   CPC ......... H04L 63/06; H04L 9/0637; H04L 9/12; H04L 9/0822; H04W 12/30
   (Continued)

(56) References Cited

U.S. PATENT DOCUMENTS

| | | | |
|---|---|---|---|
| 7,653,727 B2 * | 1/2010 | Durham | G06F 9/4411 709/225 |
| 8,005,879 B2 * | 8/2011 | Bornhoevd | G06F 8/60 707/899 |

(Continued)

OTHER PUBLICATIONS

Gaabriele D'Angelo, "Alma Matter Studiorum—Universitá Di Bologna; Ethereum Blockchain as a Decentralized and Autonomous Key Server: Storing and Extracting Public Keys Through Smart Contracts," Anno Accademico 2016/2017, Sesione II, Tesi MAgistrale in Sicurezza delle Reti, Presentata de: Pier Francesco Costa, 105 Pages.

(Continued)

*Primary Examiner* — Michael W Chao
*Assistant Examiner* — Peiliang Pan
(74) *Attorney, Agent, or Firm* — Joseph Mencher

(57) ABSTRACT

A redundant key management system includes a key management system coupled to a plurality of server devices through a network. A first server device includes a managed device coupled to a first remote access controller device that receive a device locking key from the key management system and uses it to lock the managed device. The first remote access controller device then encrypts the device locking key, broadcasts the encrypted device locking key through the network to a second remote access controller device in a second server device, and erases the device locking key. Subsequently, the first remote access controller device transmits a request to retrieve the encrypted device locking key. When the first remote access controller receives the encrypted device locking key from the second remote access controller device, it decrypts the encrypted device locking key and uses the resulting device locking key to unlock the managed device.

20 Claims, 8 Drawing Sheets

(51) Int. Cl.
*H04L 9/12* (2006.01)
*H04W 12/30* (2021.01)

(58) Field of Classification Search
USPC .......................................................... 713/171
See application file for complete search history.

(56) References Cited

U.S. PATENT DOCUMENTS

| | | | | |
|---|---|---|---|---|
| 8,099,495 | B2* | 1/2012 | Sood | H04L 9/3234 |
| | | | | 709/225 |
| 8,266,433 | B1* | 9/2012 | Przykucki | H04L 63/06 |
| | | | | 713/168 |
| 10,120,572 | B2* | 11/2018 | Chung | H04L 67/28 |
| 10,320,843 | B1* | 6/2019 | Dobrek | H04L 9/3239 |
| 2008/0052331 | A1* | 2/2008 | Ogawa | G06F 3/0605 |
| 2009/0003319 | A1* | 1/2009 | Sood | H04L 12/66 |
| | | | | 370/352 |
| 2009/0169020 | A1* | 7/2009 | Sakthikumar | H04L 41/00 |
| | | | | 380/278 |
| 2011/0277038 | A1* | 11/2011 | Sahita | G06F 21/6281 |
| | | | | 726/27 |
| 2012/0233455 | A1* | 9/2012 | Kahler | H04L 9/0825 |
| | | | | 713/155 |
| 2015/0193620 | A1* | 7/2015 | Khatri | G06F 21/575 |
| | | | | 713/2 |
| 2015/0215118 | A1* | 7/2015 | Acar | H04L 9/3247 |
| | | | | 380/282 |
| 2017/0116103 | A1* | 4/2017 | Cencini | H04L 67/1042 |
| 2019/0342079 | A1* | 11/2019 | Rudzitis | H04L 63/06 |
| 2019/0370011 | A1* | 12/2019 | Liu | G06F 9/30098 |
| 2020/0186342 | A1* | 6/2020 | Zhang | H04L 9/0872 |
| 2020/0233983 | A1* | 7/2020 | Robison | G06F 21/572 |
| 2021/0034377 | A1* | 2/2021 | Martin | G06F 9/4416 |

OTHER PUBLICATIONS

Michael Egorov, Maclane Wilkison and David Ñunez, "NuCypher KMS: Decentralized Key Management System," Nov. 12, 2017, arXiv:1707.06140v5 [Cs.CR], 21 Pages.

* cited by examiner

REDUNDANT DEVICE LOCKING KEY MANAGEMENT SYSTEM

BACKGROUND

The present disclosure relates generally to information handling systems, and more particularly to redundant management of device locking keys used with managed devices in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems such as, for example, server systems in datacenters, may employ enhanced security by locking managed devices within the server system with device locking keys. For example, for many server systems in datacenters, network-based key management systems have been developed to provide for the centralized management of device locking keys used to lock managed devices in the server systems, with the server systems configured to retrieve those device locking keys via in-band methods (e.g., using operating system services provided via an application or agent running in the operating system on the server system) or out-of-band methods (e.g., via a remote access controller that operates independently of the operating system and uses a dedicated network connection to the key management system that is separate from that used by the operating system.) However, the use of such network-based key management systems can raise issues.

For example, if the key management system suffers a data loss or becomes unavailable, managed devices in the server systems across the network that have been locked will be inaccessible, preventing some or all of the functionality of the server systems. Whether such issues are temporary (e.g., when the key management system is temporarily unavailable due to a reset) or permanent (e.g., when the key management system loses data that includes the locking keys that allow the devices in the server systems to be unlocked), the key management system represents a single point of failure. One solution to this issue is to provide a redundant key management system in the datacenter, which may be used in the event of a data loss or unavailability of the primary key management server. However, dedicating an additional key management system for redundant operations is expensive, particularly when such redundant key management systems may rarely, if ever, be utilized to perform key management operations.

Accordingly, it would be desirable to provide an improved redundant key management system.

SUMMARY

According to one embodiment, an Information Handling System (IHS) includes a processing system; and a memory system that is coupled to the processing system and that includes instructions that, when executed by the processing system, cause the processing system to provide a remote access controller engine that is configured to: receive, through a network from a key management system, a device locking key; lock, using the device locking key, a managed device; encrypt the device locking key to provide an encrypted device locking key; broadcast, through the network to a plurality of remote access controller devices provided in respective server devices, the encrypted device locking key; erase, subsequent to broadcasting the device locking key, the encrypted device locking key; transmit, subsequent to erasing the device locking key, a request to retrieve the encrypted device locking key; receive, through the network from the at least one of the plurality of remote access controller devices in response to transmitting the request to retrieve the device locking key, the encrypted device locking key; decrypt the encrypted device locking key to provide the device locking key; and use the device locking key to unlock the managed device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
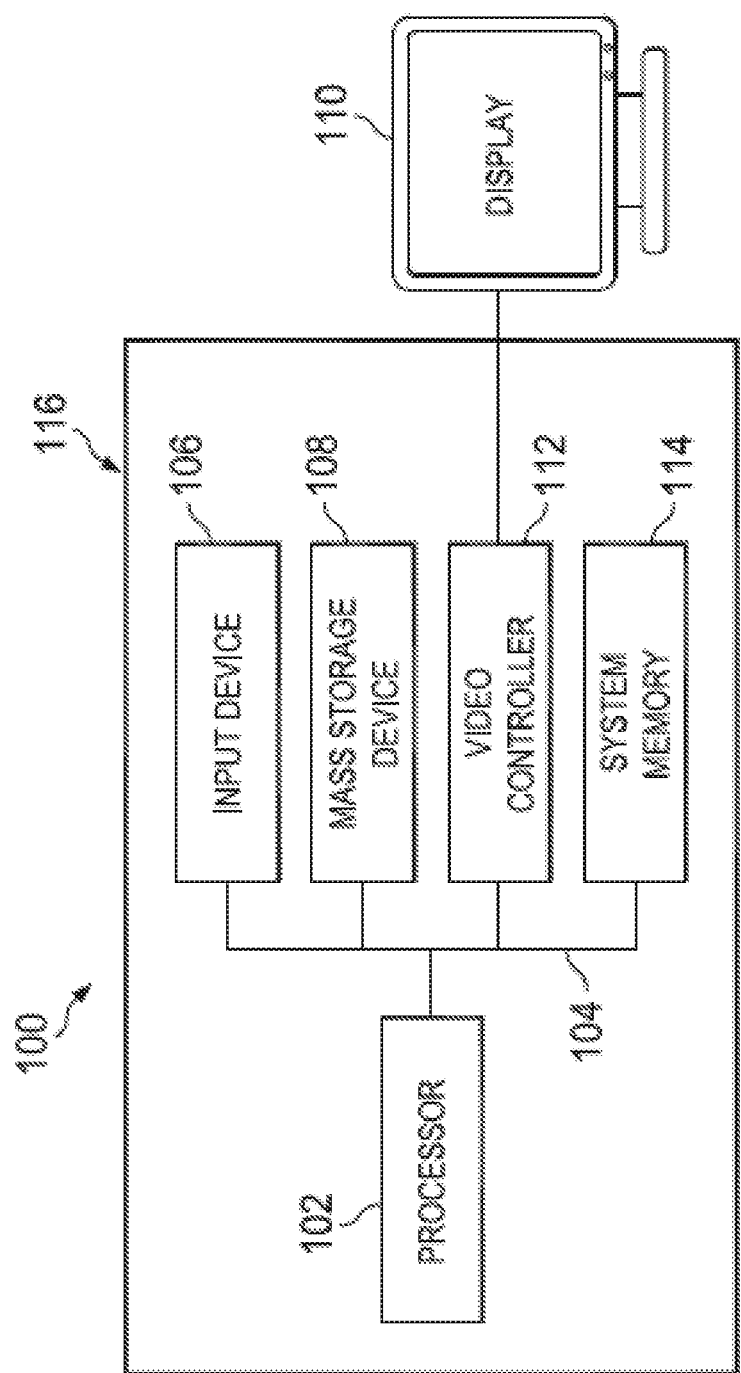
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
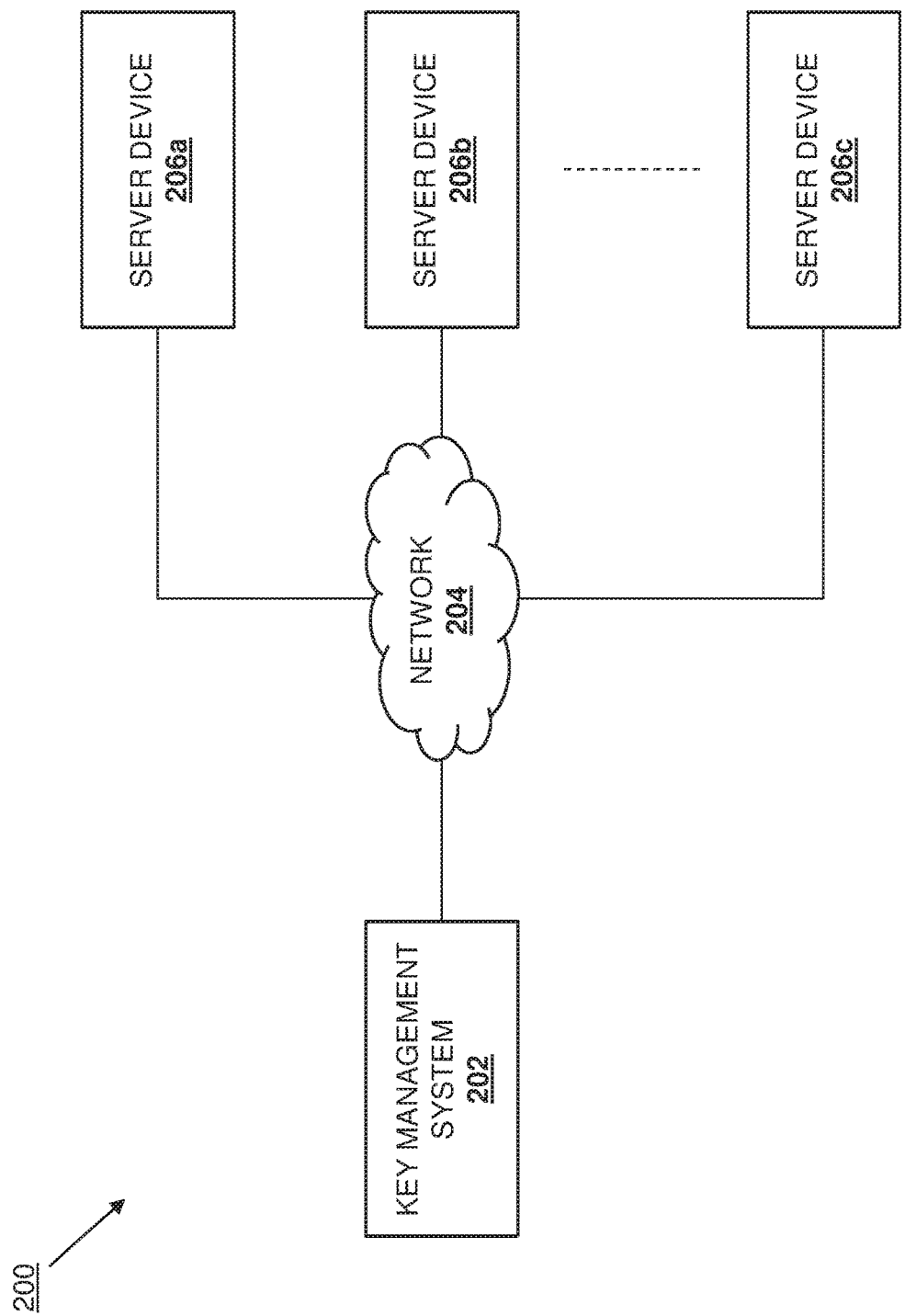
FIG. 2 is a schematic view illustrating an embodiment of a redundant key management system.

Referring now to FIG. 2, an embodiment of a redundant key management system 200 is illustrated. In the illustrated embodiment, the redundant key management system 200 includes a key management system 202 that may be provided by one or more key management server devices, any of which may be provided by the IHS 100 discussed above with reference to FIG. 1, and/or may include some or all of the components of the IHS 100. For example, the key management system 200 may be provided by server device(s) operating according to the Key Management Interoperability Protocol (KMIP) to provide a KMIP server. One of skill in the art in possession of the present disclosure will recognize that the KMIP is an extensible communication protocol that defines message formats for the manipulation of cryptographic keys via server device(s) providing the key management system 202, which facilitates data encryption by simplifying encryption key management. As such, keys may be created on a server and then retrieved, possibly wrapped by other keys, with both symmetric and asymmetric keys supported, and including the ability to sign certificates. One of skill in the art in possession of the present disclosure will recognize that the KMIP also allows for clients to ask a server to encrypt or decrypt data, without needing direct access to the key. However, while a specific protocol is discussed herein as being utilized by the key management system 200, one of skill in the art in possession of the present disclosure will recognize that keys may be managed according to the teachings of the present disclosure via a variety of key management protocols while remaining within the scope of the present disclosure as well.

In the illustrated embodiment, the key management server system 202 is coupled to a network 204 that may be provided by a Local Area Network (LAN), the Internet, and/or any other network that would be apparent to one of skill in the art in possession of the present disclosure. Furthermore, a plurality of managed systems may be coupled to the management system of the present disclosure via the network 204. In an embodiment, any or all of the managed systems may be provided by the IHS 100 discussed above with reference to FIG. 1, and/or may include any or all of the components of the IHS 100. For example, in the illustrated embodiment, the managed systems are provided by server devices 206*a*, 206*b*, and up to 206*c*, each of which is coupled through the network 204 to the key management system 202, and each of which may operate as a KMIP client. While one of skill in the art in possession of the present disclosure will recognize that the embodiment discussed below describe a datacenter including a datacenter network that couples together the key management system and the managed systems, any of a variety of managed systems may be coupled to a key management system via a network while operating according to the teachings of the present disclosure, and those embodiments are envisioned as falling within the scope of the present disclosure as well.

Figure 3:
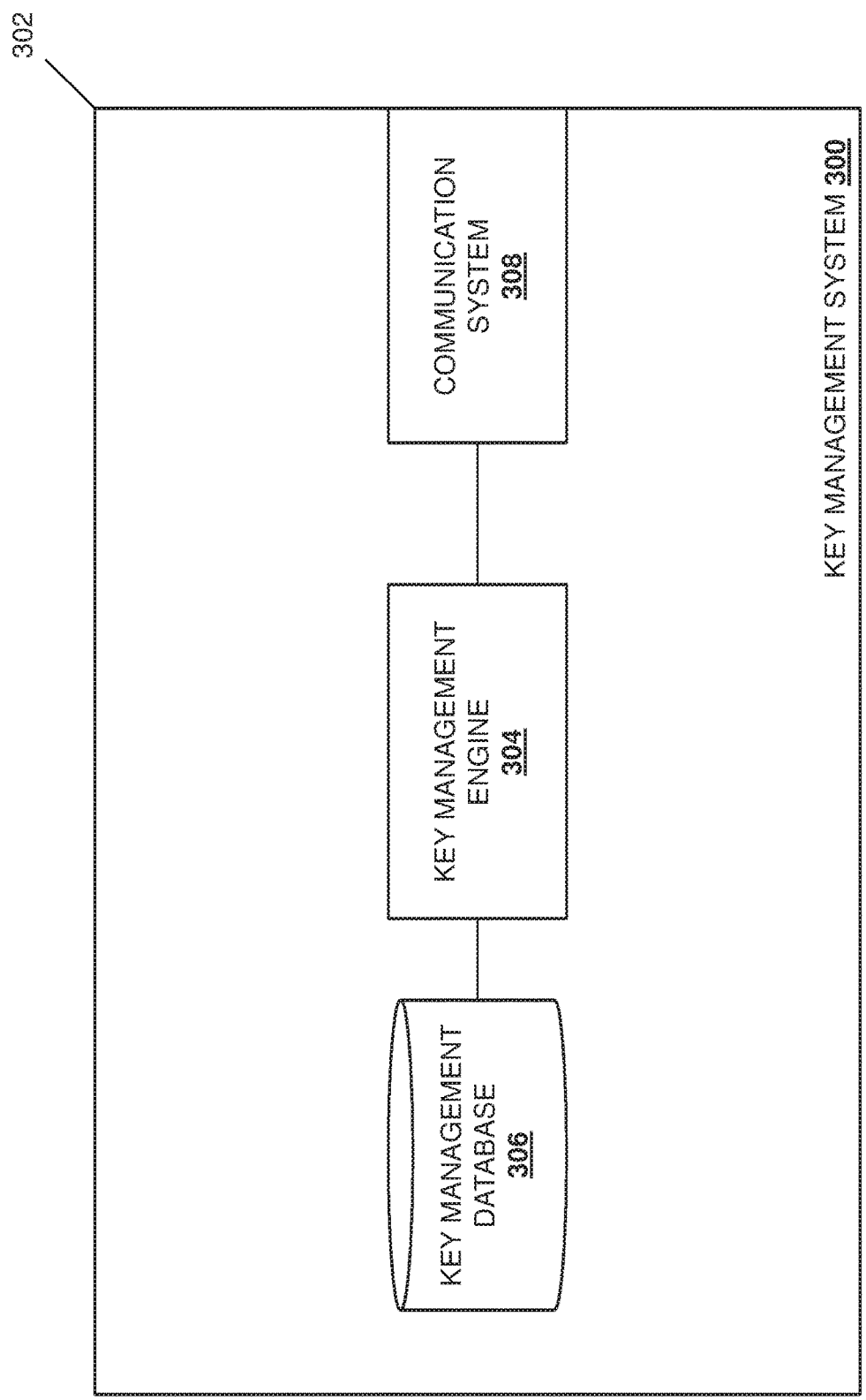
FIG. 3 is a schematic view illustrating an embodiment of a key management system that may be provided in the redundant key management system of FIG. 2.

Referring now to FIG. 3, an embodiment of a key management system 300 that may provide the key management system 202 discussed above with reference to FIG. 2 is illustrated. As such, the key management system 202 may be provided by the IHS 100 discussed above with reference to FIG. 1, and/or may include any or all of the components of the IHS 100, and in specific examples may be configured to operated as a KMIP server according to the KMIP as discussed above. In the illustrated embodiment, the key management system 300 includes a chassis 302 that houses the components of the key management system 300, only some of which are illustrated in FIG. 3. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a key management engine 304 that is configured to perform the functionality of the key management engines and key management systems discussed below.

The chassis 302 may also house a storage system (not illustrated, but which may include the storage device 108 discussed above with reference to FIG. 1) that is coupled to the key management engine 304 (e.g., via a coupling between the processing system and the storage system) and that includes a key management database 306 that is configured to store any of the information utilized by the key management engine 304 and/or the key management system 300 as discussed below. The chassis may also house a communication system 308 that is coupled to the key management engine 304 (e.g., via a coupling between the processing system and the communication system 308) and that may include a Network Interface Controller (NIC), a wireless communication subsystem (e.g., a BLUETOOTH® communication subsystem, a Near Field Communication (NFC) subsystem, a WiFi communication subsystem, etc.), and/or any other communication components that would be apparent to one of the skill in the art in possession of the present disclosure. While a specific key management system 300 has been illustrated and described, one of skill in the art in possession of the present disclosure will recognize that key management systems may include a variety of components and/or component configuration for providing the functionality discussed below while remaining within the scope of the present disclosure as well.

Figure 4:
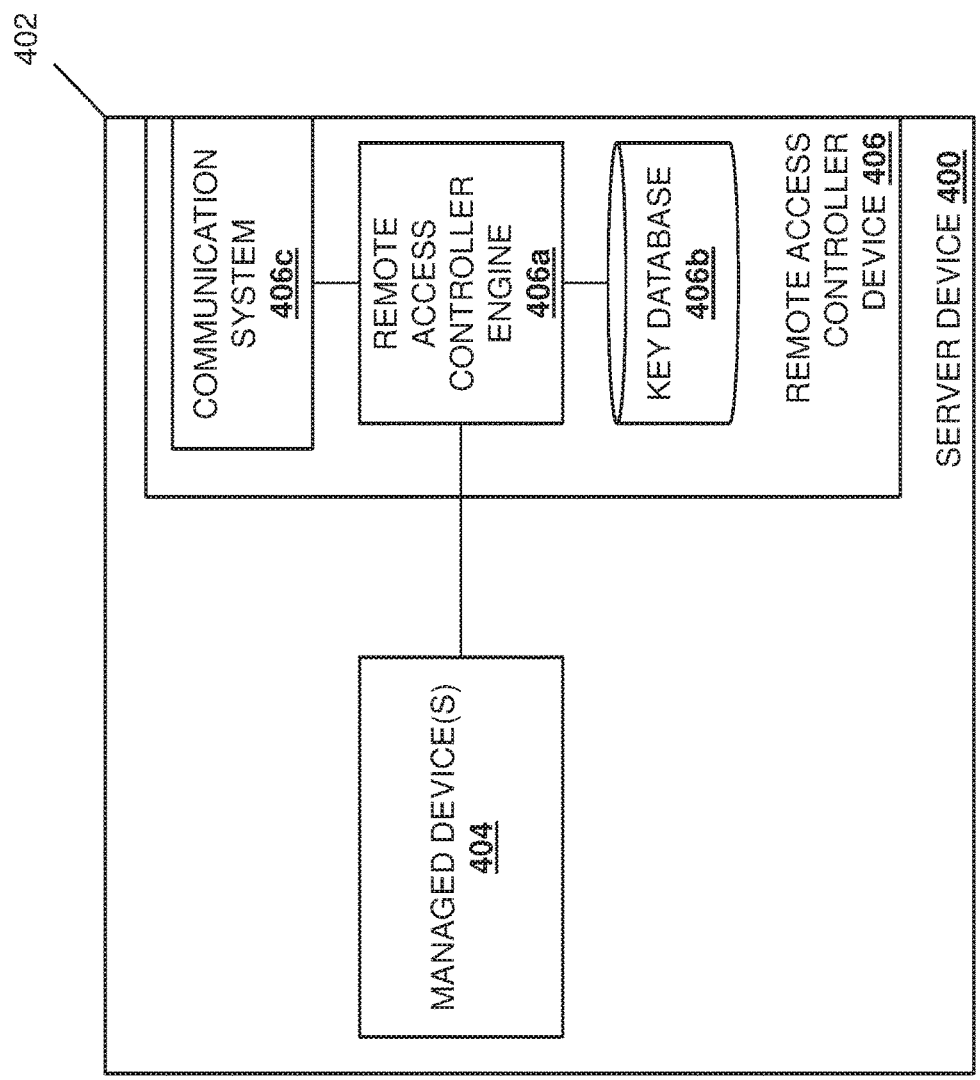
FIG. 4 is a schematic view illustrating an embodiment of a server device that may be provided in the redundant key management system of FIG. 2.

Referring now to FIG. 4, an embodiment of a managed system provided by a server device 400 is illustrated. The server device 400 may be any or all of the server devices 206a-c discussed above with reference to FIG. 2 and, as such, may be provided by the IHS 100 discussed above with reference to FIG. 1, and/or may include any or all of the components of the IHS 100, and in specific examples may be configured to operate as a KMIP client. In the illustrated embodiment, the server device 400 includes a chassis 402 that houses the components of the server device 400, only some of which are illustrated in FIG. 4. In the illustrated embodiment, the chassis 402 houses one or more managed devices 404. In the examples provided below, the managed devices 404 are provided by storage devices. However, one of skill in the art in possession of the present disclosure will recognize that the managed devices 404 may be provided by any devices that are configured to be locked and unlocked using the device locking keys provided via the key management system 202/300, discussed above.

In the illustrated embodiment, the chassis 402 houses a remote access controller device 406 that is coupled to each of the managed devices 404. In a specific example, the remote access controller device 406 may be provided by, for example, an integrated DELL® Remote Access Controller (iDRAC®) available from DELL® Inc. of Round Rock, Tex., United States. As would be understood by one of skill in the art in possession of the present disclosure, remote access controller devices may provide an out-of-band management platform for server systems (e.g., via a separate expansion card, or integrated into the main circuit board as with the iDRAC® discussed above), and may operate using remote access controller resources that are separate from the server resources utilized by the server system, while providing a browser-based-interface and/or command-line-interface for allowing users to manage and monitor the server system. As discussed below, the remote access controller device 404 may include a remote access controller processing system (not illustrated, but which may include the processor 102 discussed above with reference to FIG. 1) and a remote access controller memory system (not illustrated, but which may include the memory 114 discussed above with reference to FIG. 1) that is coupled to the remote access controller processing system and that includes instructions that, when executed by the remote access controller processing system, cause the remote access controller processing system to provide the remote access controller engine 406a that is configured to perform the functionality of the remote access controller engines and/or remote access controller devices discussed below. As would be understood by one of skill in the art in possession of the present disclosure, the remote access controller processing system and the remote access controller memory system may be separate and distinct from a processing system (e.g., one or more Central Processing Units (CPUs)) and a memory system utilized by the server device 400.

The remote access controller device 406 may also include a remote access controller storage system (not illustrated, but which may include the storage device 108 discussed above with reference to FIG. 1) that is coupled to the remote access controller engine 406a (e.g., via a coupling between the remote access controller processing system and the remote access controller storage system) and that includes a key database 406b that is configured to store any of the information utilized by the remote access controller engine 406a and/or the remote access controller device 406 as discussed below. The remote access controller device 406 may also include a communication system 406c that is coupled to the remote access controller engine 406a (e.g., via a coupling between the remote access controller processing system and the communication system 308) and that may include a Network Interface Controller (NIC), a wireless communication subsystem (e.g., a BLUETOOTH® communication subsystem, a Near Field Communication (NFC) subsystem, a WiFi communication subsystem, etc.), and/or any other communication components that would be apparent to one of the skill in the art in possession of the present disclosure. As would be understood by one of skill in the art in possession of the present disclosure, the communication system 406c in the remote access controller device 306c may be separate and distinct from a communication system utilized by the server device 400, and may provide an out-of-band communication path for the server device 400. While a specific server device 400 has been illustrated and described, one of skill in the art in possession of the present disclosure will recognize that server device may include a variety of components and/or component configuration for providing the functionality discussed below while remaining within the scope of the present disclosure as well. For example, the redundant key management functionality provided by the remote access controller device 406 discussed below may be provided by other components while remaining within the scope of the present disclosure as well.

Figure 5:
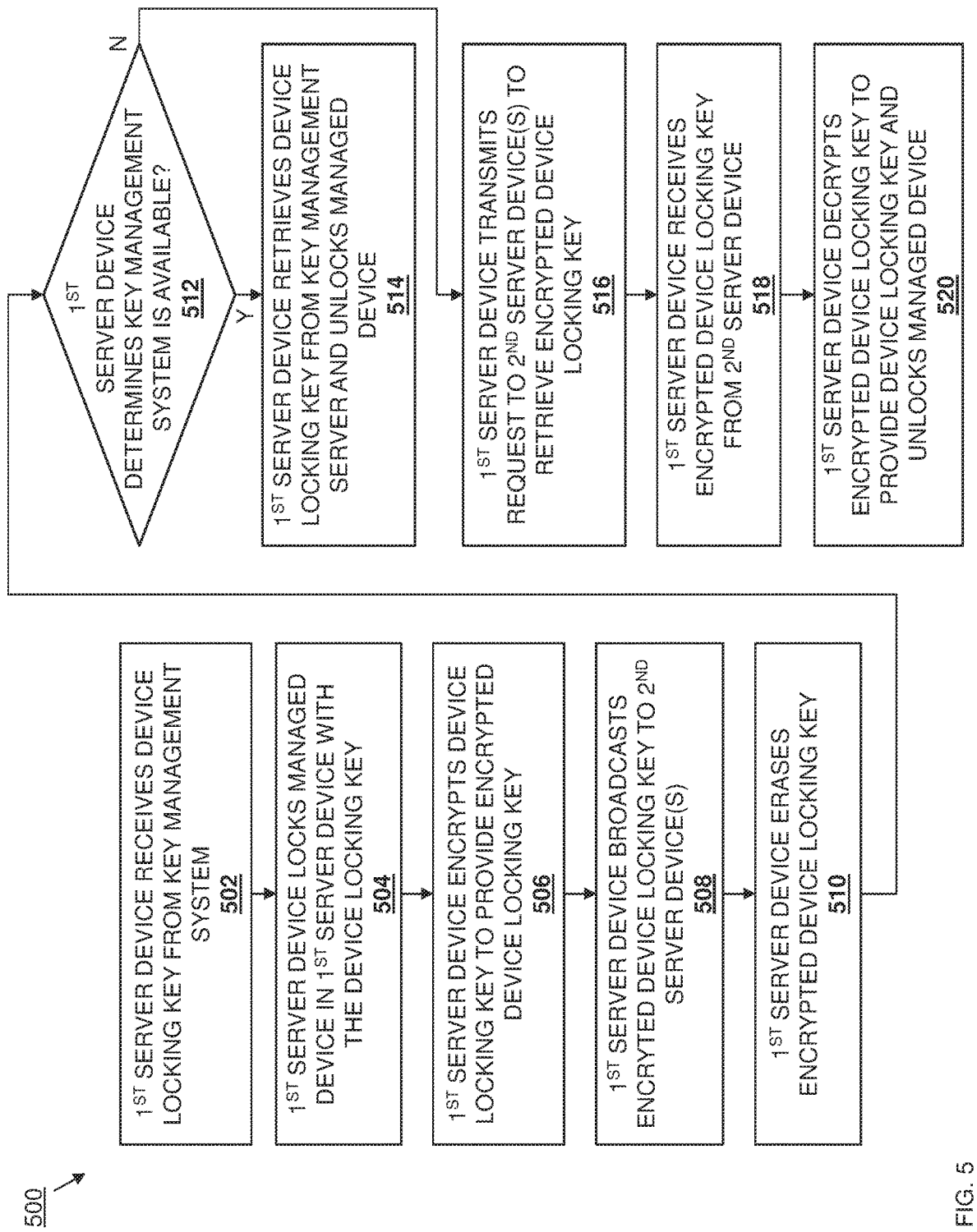
FIG. 5 is a flow chart illustrating an embodiment of a method for providing redundant key management.

Referring now to FIG. 5, an embodiment of a method 500 for redundant management of keys is illustrated. As discussed below, the systems and methods of the present disclosure provide for redundant key management of device locking keys used to secure managed devices in a datacenter without the need to provide a secondary/backup/redundant key management system in that datacenter. In some embodiments, remote access controller devices in server devices that include the managed device(s) discussed above operate in cooperation to provide redundant key management for each other, and in the event of the unavailability of the primary key management system in the datacenter, provide device locking keys to each other in order to allow the managed device(s) to be unlocked. In some of the examples discussed below, a first remote access controller device that receives a device locking key from the key management system and uses that device locking key to lock a managed device may then encrypt that device locking key and broadcast a request to second remote access controller devices to store the encrypted device locking key. In response to an acceptance of the request, the first remote access controller device may then erase the encrypted device locking key (which is now stored by one or more of the second remote access controller devices.) Subsequently, in the event the primary key management system becomes unavailable when the managed device is to be unlocked, the first remote access controller device may retrieve the encrypted device unlocking key from any of the second remote access controller device(s), decrypt it, and use the resulting device unlocking key to unlock the managed device.

Furthermore, in some of the examples discussed below, a first remote access controller device that receives a device locking key from the primary key management system and uses that device locking key to lock a managed device may then encrypt that device locking key and broadcast the encrypted device locking key as part of a first blockchain transaction that is directed to a blockchain address on a blockchain that is associated with a smart contract and that is maintained by the first remote access controller device and a plurality of second remote access controller devices. One of the remote access controller devices will then process that first blockchain transaction to cause the smart contract to execute and add the encrypted device locking key to the blockchain (e.g., in a hash table of the smart contract). The first remote access controller device may then erase the encrypted device locking key (which is now stored on the blockchain.) Subsequently, in the event the primary key management system becomes unavailable when the managed device is to be unlocked, the first remote access controller device may broadcast a second blockchain transaction that is directed to the blockchain address on the blockchain that is associated with the smart contract. One of the second remote access controller devices will then process that second blockchain transaction to cause the smart contract to execute and transmit the encrypted device locking key to first remote access controller device. The first remote access controller device may then decrypt the encrypted device locking key, and use the resulting device unlocking key to unlock the managed device. As such, redundant key management is provided by one or more server device in a datacenter that may include the managed devices that are unlocked using the device locking keys under management, which eliminates the need to provide a secondary/backup/redundant, and rarely used, key management system.

The method 500 begins at block 502 where a first server device receives a device locking key from a key management system. In an embodiment, at block 502, the remote access controller engine 406a provided by the remote access controller device 406 included in the server device 400 (which, in the examples below, is the server device 206a) may transmit a device locking key request via its communication system 206c through the network 204. As such, the key management engine 304 provided by the key management system 300 (which may be the key management system 202) may receive that device locking key request via its communication system 308. For example, the remote access controller engine 406a may operate as a KMIP client to request a device locking key for any of its managed devices 404a and, in response, the key management engine 304 may operate as a KMIP server to generate, allocate, and/or otherwise provide a device locking key for the managed device 404 through the network 204 to the remote access controller engine 406a. While not described in detail, one of skill in the art in possession of the present disclosure will recognize how device locking keys may be requested by KMIP clients (e.g., provided by the server devices 206a-c) and provided by KMIP servers (e.g., provided by the key management system 202). As such, at block 502, the remote access controller engine 406a may receive a device locking key for any of its managed device(s) 404, and may store that device locking key in the key database 406b.

In a specific example, when remote access controller engines 406a provided by the remote access controller devices 406 included in the server devices 206a-c have authenticated with the key management system 202 and a key store, the key management system 202 may encrypt that key store (which includes the device locking key) with a public key associated with the key management system 202. That encrypted key store and public key may then be bundled together and transmitted to the first remote access controller engine 406a provided by the first remote access controller device 406 included in the server device 206a (e.g., for storage in the key database 406b), and the first remote access controller engine 406a provided by the first remote access controller device 406 included in the server device 206a may transmit a first remote access controller identifier for that first remote access controller device 406 (e.g., a public certificate) to the key management engine 304 in the key management system 202/400 for storage in the key management database 306 (e.g., for tracking the device locking key/key store.) However, in other examples, the key management engine 304 in the key management system 202/300 may encrypt the device locking key and transmit that encrypted device locking key to the first remote access controller engine 406a provided by the first remote access controller device 406 included in the server device 206a, and the first remote access controller engine 406a may store that encrypted device locking key in the key database 406b (e.g., provided by a credential vault or other secure storage system.)

The method 500 then proceeds to block 504 where the first server device locks a managed device with the device locking key. In an embodiment, at block 504, the remote access controller engine 406a provided by the remote access controller device 406 included in the server device 206a/400 may use the device locking key received at block 502 in order to lock any of its managed device(s) 404. While not described in detail, one of skill in the art in possession of the present disclosure will recognize how device locking keys may be used by KMIP clients (e.g., the server devices 206a-c) to lock managed devices. As discussed above, in some examples, the device locking key may be provided as part of an encrypted key store or as an encrypted device locking key, and at block 504 the remote access controller engine 406a may operate to decrypt the encrypted key store or encrypted device locking key in order to lock the managed device. As such, following block 504, at least one managed device 404 in the server device 400 is locked via a device locking key that was provided by the key management system 202/300.

The method 500 then proceeds to block 506 where the first server device encrypts the device locking key to provide an encrypted device locking key. In an embodiment, at block 506, the remote access controller engine 406a provided by the remote access controller device 406 included in the server device 206a/400 may encrypt the device locking key received at block 502 in order to provide an encrypted device locking key. While not described in detail, one of skill in the art in possession of the present disclosure will recognize how device locking keys may be encrypted using a variety of encryption techniques known in the art. As discussed above, in some embodiments, the device locking key may be encrypted by the key management system 202/300 (either by itself or as part of a key store), and thus block 506 may be skipped in some examples. As such, following block 504, the encrypted device locking key is the only form of the device locking key that present on the server device 400.

The method 500 then proceeds to block 508 where the first server device broadcasts the encrypted device locking key to one or more second server device(s). In an embodiment, at block 508, the remote access controller engine 406*a* provided by the remote access controller device 406 included in the server device 206*a*/400 operates to broadcast the encrypted device locking key to one or more of the remote access controller devices 406*a* included in the server devices 206*b* and/or 206*c*. As discussed below, in some examples, the remote access controller devices 406*a* in the server devices 206*a-c* may directly share encrypted device locking keys with each other for storage in order to provide redundant key management, while in other examples, the remote access controller devices 406*a* in the server devices 206*a-c* may operate to provide redundant key management via a key management blockchain, and thus "broadcasting" of the encrypted device locking key may be performed differently based on the redundant key management techniques utilized as described herein. Furthermore, in yet other examples, combinations of the redundant key management provided via direct encrypted device locking key sharing and a blockchain will fall within the scope of the present disclosure as well.

Figure 6A:
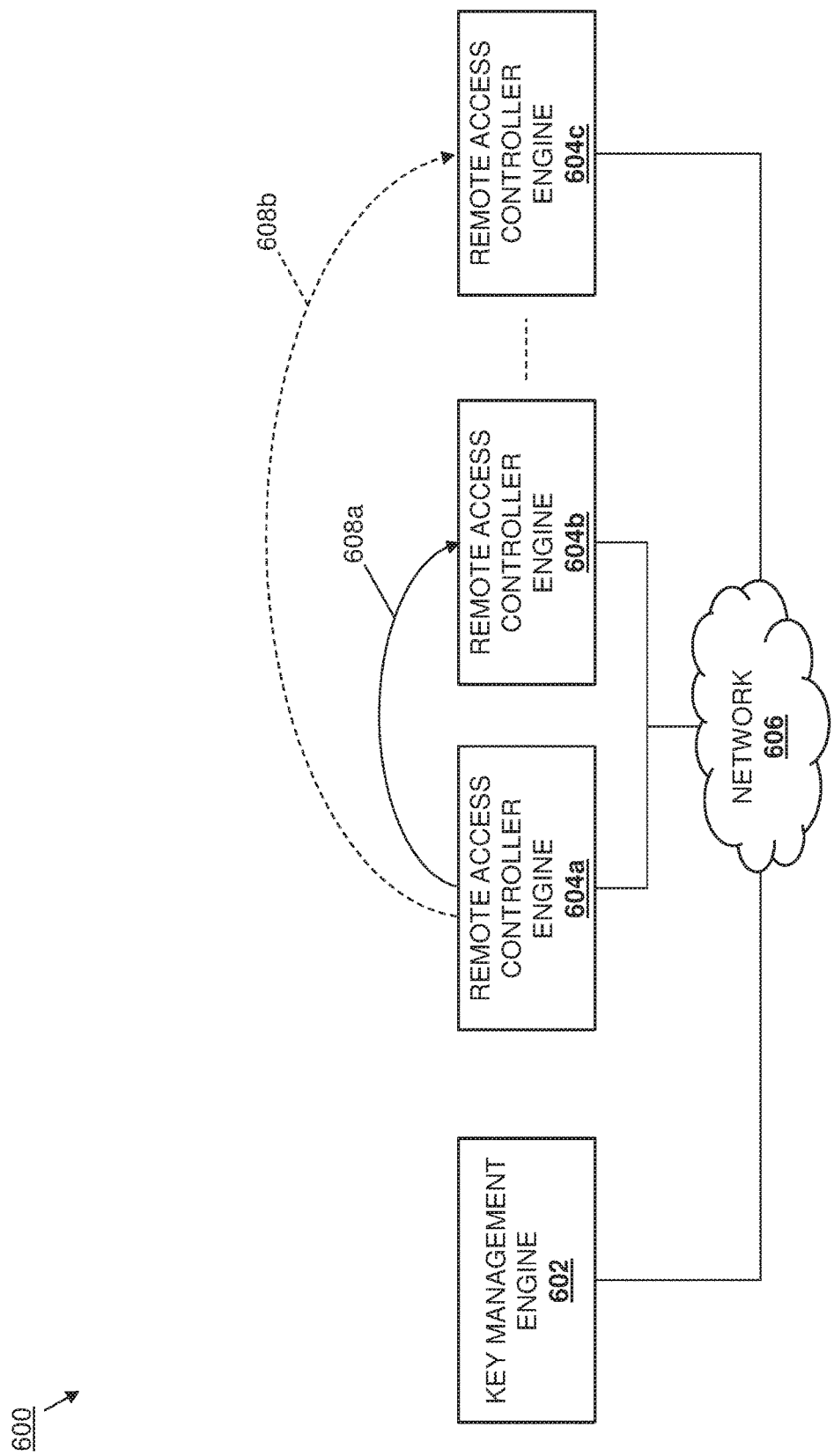
FIG. 6A is a schematic view illustrating an embodiment of the redundant key management system of FIGS. 2, 3, and 4 providing redundant key management according to the method of FIG. 5.
Figure 6B:
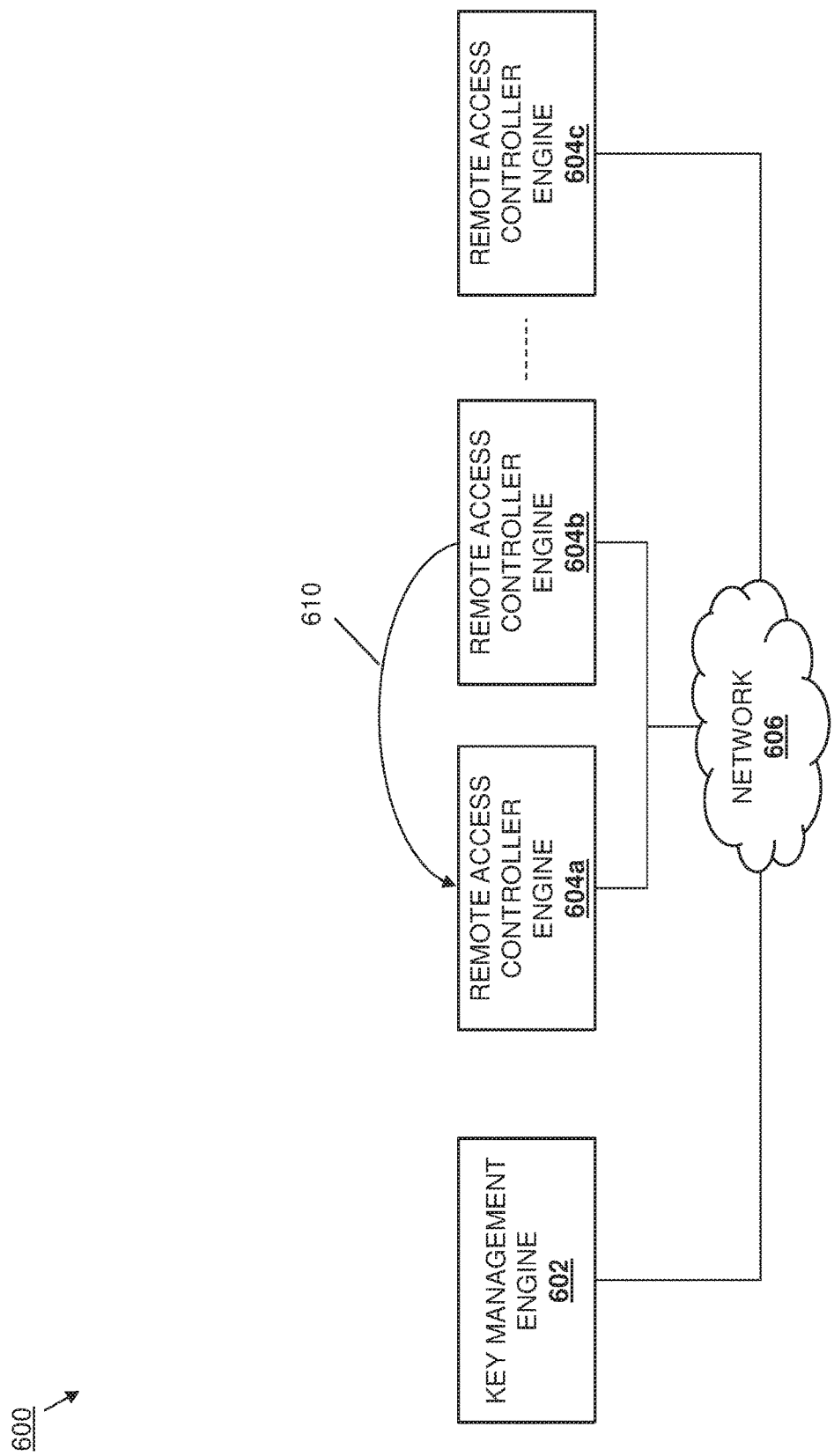
FIG. 6B is a schematic view illustrating an embodiment of the redundant key management system of FIGS. 2, 3, and 4 providing redundant key management according to the method of FIG. 5.

For example, FIGS. 6A and 6B illustrate an example of a redundant key management system 600 providing the direct encrypted device locking key sharing discussed above. The redundant key management system 600 includes a key management engine 602 (which may be provided by the key management engine 304 discussed above with reference to FIG. 3) coupled to remote access controller engines 604*a*, 604*b*, and 604*c* (each which may be provided by the remote access controller engine 406*a* discussed above with reference to FIG. 4) via a network 606 (which may be the network 204 discussed above with reference to FIG. 2). FIG. 6A illustrates an example of how a first remote access controller engine 604*a* (e.g., the remote access controller engine discussed above as receiving the device locking key at block 502, locking a managed device with the device locking key at block 504, and encrypting the device locking key at block 506 above) may broadcast the encrypted device locking key to second remote access controller devices 604*b* and up to 604*c* (e.g., via the network 606.) In a specific example, at block 508, the remote access controller engine 604*a* may first broadcast, to the remote access controller engines 604*b-c*, a request to store the encrypted device locking key. In response, any of the remote access controller engines 604*b-c* receiving that request may transmit an acceptance to store the encrypted device locking key, which may cause the remote access controller engine 604*a* to transmit the encrypted device locking key to the remote access controller device(s) 604*b-c* that provided the acceptance (e.g., as illustrated by the line 608*a* and optional line 608*b* in FIG. 6A.)

As such, in some embodiments, the broadcasting of the encrypted device locking key at block 508 of the method 500 may be include the transmittal of the encrypted device locking key by a first remote access controller device to one or more second remote access controller devices following the broadcasting of a request to store that encrypted device locking key by the first remote access controller device and an acceptance by the one or more second remote access controller devices. In some specific examples, the second remote access controller device that is the first to respond to the request to store the encrypted device locking key may be the second remote access controller device to which the first remote access controller device transmits the encrypted device locking key. However, in other examples, the first remote access controller device may transmit the encrypted device locking key to any number of second remote access controller devices (e.g., in order to provide increased redundancy) while remaining within the scope of the present disclosure as well.

In a specific example, the first remote access controller engine in the first remote access controller device may provide the encrypted device locking key along with a first remote access controller device identifier as part of a key bundle, and then transmit the encrypted device locking key to the second remote access controller engine(s) in the second remote access controller device(s) as part of the key bundle in substantially the same manner as discussed above. While not described in detail, one of skill in the art in possession of the present disclosure will recognize that the encryption of the encrypted device locking key and/or the key bundle by the first remote access controller engine ensures that only the first remote access controller engine may decrypt that encrypted device locking key and/or key bundle in order to access the device locking key stored therein. In response to receiving the encrypted device locking key, each of the second remote access controller engines 406*a* provided by the second remote access controller devices 406 included in the server devices 206*b-c* that received that encrypted device locking key may transmit respective second remote access controller device identifiers for their second remote access controller devices 406 to the first remote access controller engine 406*a*, and the first remote access controller engine 406*a* may store those second remote access controller device identifiers in its key database 406*b*.

Figure 7:
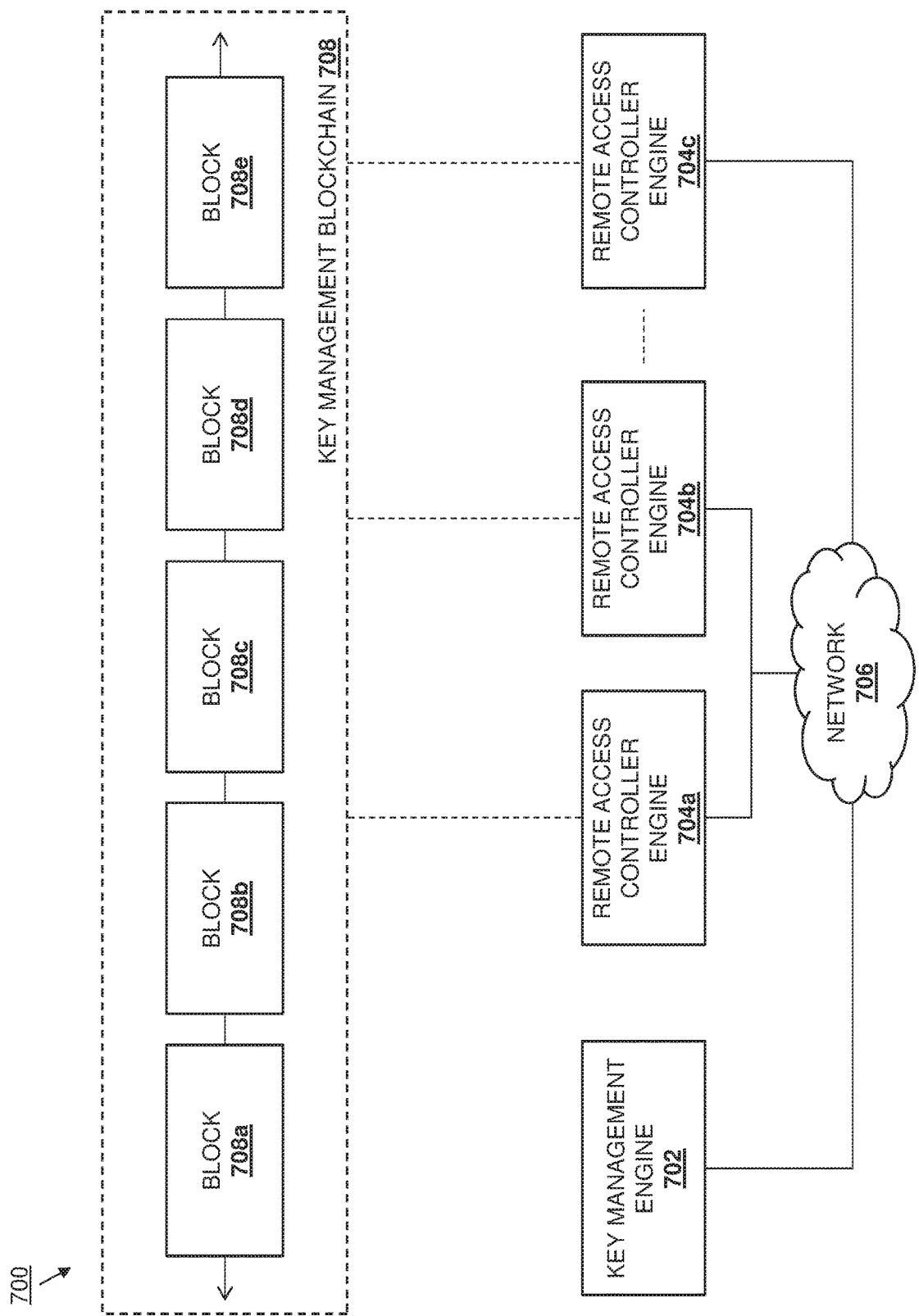
FIG. 7 is a schematic view illustrating an embodiment of the redundant key management system of FIGS. 2, 3, and 4 utilizing a key management blockchain to provide redundant key management according to the method of FIG. 5.

In another example, FIG. 7 illustrates an example of a redundant key management system 700 providing the blockchain storage of encrypted device locking keys discussed above. The redundant key management system 700 includes a key management engine 702 (which may be provided by the key management engine 304 discussed above with reference to FIG. 3) coupled to remote access controller engines 704*a*, 704*b*, and 704*c* (each which may be provided by the remote access controller engine 406*a* discussed above with reference to FIG. 4) via a network 706 (which may be the network 204 discussed above with reference to FIG. 2). FIG. 7 illustrates an example of how the remote access controller devices 704*a-c* may operate to maintain a key management blockchain 708. For example, as discussed below, the remote access controller engines 704*a* may be configured to operate both as blockchain transaction nodes that generate and broadcast blockchain transactions, and as blockchain miner nodes that process the broadcast blockchain transactions into blocks (e.g., the blocks 708*a-e*) that provide the key management blockchain 708. While not described in detail herein, one of skill in the art in possession of the present disclosure will recognize that the remote access controller engines 704*a-c* may each store (e.g., in their key databases 406*b*) a copy of the key management blockchain 708, with each block 708*a-e* in the key management blockchain 708 generated and added to the key management blockchain 708 by the remote access controller engines 704*a-c* via the grouping the blockchain transactions discussed below into a current block, "solving" that current block by performing a hash operation on the combination of the blockchain transactions, a nonce, and a hash of the previous block in order to produce a desired result (e.g., a value with a required number of zero bits), and adding the solved current block to the blockchain. However, while a "proof-of-work" blockchain has been described, other type of blockchains (e.g., proof-of-stake) may be utilized while remaining within the scope of the present disclosure as well.

Prior to the method 500, a key management smart contract may be provided on the key management blockchain 708 by, for example, the key management system 202/300 or other computing system acting as a KMIP server with an Externally Owned Account (EOA) generating a blockchain transaction that includes the code that provides the smart contract, and broadcasting that blockchain transactino to a blockchain address included on the key management blockchain 708. The remote access controller engines 704a-c will receive that blockchain transaction and process it as part of a block that is added to the key management blockchain 708, which causes the smart contract to be added/provided on the key management blockchain 708 in association with a blockchain address on the key management blockchain 708. As discussed below, the smart contract may include code that is configured to provide for the storage of encrypted device locking keys, the transmittal of encrypted device locking keys, and/or any other functionality discuss below. In a specific example, the smart contract on the key management blockcahin 708 may provide a distributed application (i.e., a "DAPP") that is executable by any of the remote access controller engines 704a-c that maintain the key management blockchain 708. An example smart contract for performing the functionality described herein is reproduced below:

One of skill in the art in possession of the present disclosure will recognize that, in the example code above, "contract ekms{ }" may be the smart contract that is deployed, "function ekms( )" may be the constructor which stores the 20 byte address of an Externally Owned Account (EOA) that has deployed the smart contract (e.g., by the key management system 202 operating as a KMIP server), the "keystore{ }" may define the data type for the storage, the "uuids" may define the hash table for the UUID-to-keystore mapping, the "event Create_Key( )" may be configured to send events to the key management system 202 operating as a KMIP server, the "function generate_key( ) may be called by a remote access controller engine operating as a KMIP client with a Universally Unique IDentifier (UUID) and may operate to send an event to the key management system 202 acting as a KMIP server with the UUID for key generation, the "function set_key( )" may be called by the key management system 202 operating as a KMIP server to store encrypted keys with permission set to corresponding remote access controller engine acting as KMIP clients, the "function get_client_kek( ) may be called by the remote access controller engine acting as a KMIP client to retrieve the key with the client addresses validated again the UUID, and the "function ekms_backup( )" may be restricted to the key management system 202 acting as a KMIP server for admin-

```
pragma solidity ^0.4.22;
contract ekms (
    address public kmip_server;
    // Event to KMIP Server EOA to generate Key
    event Create_Key (address indexed sender, address indexed receiver, wint64 c_uuid);
    // EKMS Constructor
    function ekms( ) {
    // Store the 20-byte address of KMIP Server EOA
        kmip_server = msg.sender;
    }
    // Key data for the Hash-Table
    struct keystore{
        address kmip_client;
        string server_kek; // KEK Encrypted with public key of kmip_server
        string client_kek; // KEK Encrypted wit public key of kmip_client
    }
    // Hash-Table mapped to UUID which stores the keystore structure
    mapping (Unit64 => keystore) public uuids;
    // Function called by KMIP Server EOA to store the encrypted key
    function set_key (address client_addr, string s_kek, string c_kek, wint64 uuid) public
    returns (bool status){
        require (msg.sender == kmip_server, "Only kmip_server can set the key");
        uuids[uuid].kmip_client = client_addr;
        uuids[uuid].server_kek = s_kek;
        uuids[uuid].client_kek = c_kek;
        return true;
    }
    //Function called by KMIP Client EOA to initiate the Key generation
    function generate_key(uint64 cli_uuid) public
    returns (bool status){
        // Send event to KMIP Server EOA to generate the Key
        Create Key (msg.sender, kmip_server, cli_uuid);
    }
    //Function called by KMIP Client EOA to get the encrypted Key
    function get_client_kek (uint64 uuid) public returns (string client_kek){
        require (uuids[uuid].kmip_client == msg.sender, "Not Allowed");
        return uuids[uuid].client_kek;
    }
    // Function for EKMS db admin Operations
    function ekms_backup ( ) public returns (bool status){
        require (msg.sender ++ kmip_server, "Only kmip_sever EOA can take Admin");
        // Implement Privilege Operations here
    }
}
``` istrative purposes. However, while specific smart contract code has been described, a variety of other code may be utilized to perform the smart contract functionality discussed herein while remaining within the scope of the present disclosure as well.

In some embodiments, the smart contract on the key management blockchain 708 may act as an intermediary for the generation and provisioning of device locking keys at block 502 of the method 500. For example, at block 502, the first remote access controller engine 704a may operate to send a managed device identifier (e.g., the UUID discussed above) for the managed device 404 that is to-be secured as part of a blockchain transaction that is directed to the blockchain address on the key management blockchain 708 that is associated with the smart contract, and the processing of that blockchain transaction by the second remote access controller engines 704b-c may cause the smart contract to execute to send an event to the key management system 202/300 (along with the managed device identifier). In response to detecting the event, the key management engine 304 in the key management system 202/300 may generate a device locking key, encrypt the device locking key with a public key of the first remote access controller engine 704a (e.g., to provide a client Key Encryption Key (KEK) such as those described in the example smart contract code above), encrypt the device locking key with a public key of the key management system 202 (e.g., to provide a server KEK such as those described in the example smart contract code above), and then transmit the client KEK, the server KEK, and the managed device identifier as part of a blockchain transaction. The processing of that blockchain transaction by the remote access controller engines 704a-c may cause the smart contract to execute to store the client KEK, server KEK, and managed device identifier on the key management blockchain 708 (e.g., in a hash table of the smart contract).

As such, at block 508, the first remote access controller engine 704a may generate a blockchain transaction that causes the encrypted device locking key to be directed to the blockchain address that is associated with the smart contract on the key management blockchain 708 as discussed above, and broadcast that blockchain transaction to each of the second remote access controller engines 706b and up to 706c. In response, the second remote access controller engines 706b-c will operate to process blockchain transactions as part of a block that is added to the most recent block in the key management blockchain 708. As discussed above, the processing of the blockchain transactions directed to the blockchain address that is associated with the smart contract on the key management blockchain 708 may cause that smart contract to execute and store the encrypted device locking key on the key management blockchain 708 (e.g., as part of a hash table that is included in the smart contract.)

The method 500 then proceeds to block 510 where the first server device erases the encrypted device locking key. In an embodiment, at block 510, the remote access controller engine 406a provided by the remote access controller device 406 included in the server device 206a/400 may operate to erase the device locking key and/or encrypted device locking key that was stored in the key database 406b. As such, following block 510, the managed device 404 has been locked with the device locking key received at block 502, and that device locking key (and/or an encrypted device locking key created from that device locking key) are no longer stored on the remote access controller device 406/ server device 206a/400.

The method 500 then proceeds to decision block 512 where the first server device determines whether the key management system is available. In an embodiment, at block 512, the remote access controller engine 406a provided by the remote access controller device 406 included in the server device 206a/400 may determine that a managed device 404 that has been locked requires unlocking. For example, the server device 206/400 may start up, reset, boot, or otherwise initialize, and a managed storage device in that server device 206/400 may have been locked and require unlocking (e.g., in order to complete the initialization process using data stored on that managed storage device.) In response, the remote access controller engine 406a provided by the remote access controller device 406 included in the server device 206a/400 may determine whether the key management system 202/300 is available. As discussed below, the key management system 202/300 may be unavailable if a network connection to the key management system 206a has gone down, if the key management system 202/300 is resetting, if data (e.g., the device locking key needed to unlock the managed device in question) on the key management system 202/300 has been lost, etc. If, at decision block 512, the first server device determines that the key management system is available, the method 500 proceeds to block 514 where the first server device retreives the device locking key from the key management system and unlocks the managed device. In an embodiment, at block 514, the remote access controller engine 406a provided by the remote access controller device 406 included in the server device 206a/400 may determine that the key management system 202/300 is available and, in response, retrieve the device locking key from the key management system 202/300 and use that device locking key to unlock the managed device 404. While not described herein in detail, one of skill in the art in possession of the present disclosure will recognize how a KMIP client (e.g., the server devices 206a-c) may retrieve a device locking key from a KMIP server (e.g., the key management system 202), and use that device locking key to unlock a managed device, which may include the KMIP client authenticating with the KMIP server, the KMIP client decrypting an encrypted device locking key transmitted by the KMIP server, and/or other key retrieval operations known in the art.

If, at decision block 512, the first server device determines that the key management system is unavailable, the method 500 proceeds to block 516 where the first server device transmits a request to one or more second server devices to retrieve the encrypted device locking key. In an embodiment, at block 516, the remote access controller engine 406a provided by the remote access controller device 406 included in the server device 206a/400 may determine that the key management system 202/300 is unavailable and, in response, transmit a request to retrieve the encrypted device locking key. As discussed above, in some examples, the remote access controller devices 406a in the server devices 206a-c may operate to provide redundant key management via the remote access controller devices 406a in the server devices 206a-c directly sharing encrypted device locking keys with each other for storage in order to provide redundant key management, while in other examples, redundant key management may provided by a key management blockchain maintained by the remote access controller devices 406a, and thus the retrieval of the encrypted device locking key may be performed differently based on the redundant key management techniques utilized as described herein. Furthermore, in yet other examples, combinations of the redundant key management provided via the direct encrypted device locking key sharing and a blockchain will fall within the scope of the present disclosure as well.

With reference back to FIGS. 6A and 6B and the redundant key management system 600 providing the direct encrypted device locking key sharing discussed above, at block 516 the first remote access controller engine 604a may generate and transmit a request to retrieve the encrypted device locking key from the second remote access controller engine(s) 604b-c that received that encrypted device locking key at block 508 of the method 500. For example, the first remote access controller engine 604a may identify the second remote access controller engine(s) 604b-c that received that encrypted device locking key at block 508 of the method 500 via the second remote access controller device identifiers that were stored in the key database 406b at block 508, and transmit a request to each of those second remote access controller engines 604b-c to retrieve the encrypted device locking key. The request to retrieve the encrypted device locking key may include a first remote access controller device identifier for the first remote access controller device that provides the first remote access controller engine making the request. However, in other examples, the first remote access controller engine 604a may broadcast the request to retrieve the encrypted device locking key to each of the second remote access controller engine(s) 604b-c, along with a first remote access controller device identifier to indicate the identity of the first remote access controller engine 604a that is requesting their encrypted device locking key.

With reference back to FIG. 7 and the redundant key management system 700 providing the blockchain key management discussed above, at block 516, the first remote access controller engine 604a may generate and transmit a blockchain transaction that includes the request to retrieve the encrypted device locking key from the blockchain. For example, the first remote access controller engine 604a may broadcast the request to retrieve the encrypted device locking key, along with a first remote access controller device identifier to indicate the identity of the first remote access controller engine 604a that is requesting their encrypted device locking key, as part of a blockchain transaction that is received by each of the second remote access controller engine(s) 604b-c.

The method 500 then proceeds to block 518 where the first server device receives the encrypted device locking key from a second server device. In an embodiment, at block 518, the remote access controller engine 406a provided by the remote access controller device 406 included in the server device(s) 206b-c/400 may receive the request to retrieve the encrypted device locking key and, in response, transmit the encrypted device locking key to the requesting remote access controller engine/remote access controller device/server device. As discussed above, in some examples, the remote access controller devices 406a in the server devices 206a-c may directly share encrypted device locking keys with each other for storage in order to provide redundant key management, while in other examples, the remote access controller devices 406a in the server devices 206a-c may operate to provide redundant key management via a key management blockchain, and thus the provisioning of the encrypted device locking key may be performed differently based on the redundant key management techniques utilized as described herein. Furthermore, in yet other examples, combinations of the redundant key management provided via direct encrypted device locking key sharing and a blockchain will fall within the scope of the present disclosure as well.

With reference back to FIGS. 6A and 6B and the redundant key management system 600 providing the direct encrypted device locking key sharing discussed above, at block 518, any of the second remote access controller engine(s) 604b-c that received the request to retrieve the encrypted device locking key from the first remote access controller engine 604a at block 516 may identify the encrypted device locking key stored in its key database 406b for that first remote access controller engine 604a (e.g., via the first remote access controller device identifier provided by that first remote access controller engine 604a as discussed above), and then retrieve and transmit that encrypted device locking key to the first remote access controller engine 604a. FIG. 6B illustrates the remote access controller engine 604b performing an encrypted device locking key transmittal operation 610 to transmit the encrypted device locking key (or an encrypted key bundle) to the remote access controller engine 604a.

With reference back to FIG. 7 and the redundant key management system 700 providing the blockchain key management discussed above, at block 518 the second remote access controller engines 604b-c may process the blockchain transaction transmitted by the first remote access controller engine 704a at block 516 as part of a block that is added to the key management blockchain 708, which may cause the smart contract to execute to transmit the encrypted device locking key that is associated with the first remote access controller engine 704a (e.g., via the first remote access controller device identifier) and that is stored on the key management blockchain 708 (e.g., in the hash table associated with the smart contract) to the first remote access controller engine 704a. For example, with reference to the example smart contract code provide above, the smart contract may provide a function "get_client_KEK( )" to retrieve the client KEK without the intervention of the key management system 202. As such, as block 518, the first remote access controller engine 704a receives the encrypted device locking key. One of skill in the art in possession of the present disclosure will appreciate that the use of the smart contract and key management blockchain 708 to manage the device locking key results in the storage of blockchain transactions used to retrieve the encrypted device locking key by any remote access controller device, thus providing a record of all uses (and attempted uses) of encrypted device locking keys that are managed via the key management blockchain 708.

The method 500 then proceeds to block 520 where the first server device decrypts the encrypted device locking key to provide the device locking key, and uses the device locking key to unlock the managed device. In an embodiment, at block 520, the remote access controller engine 406a provided by the remote access controller device 406 included in the server device(s) 206b-c/400 may operate to decrypt the encrypted device locking key to provide the device locking key, and use the device locking key to unlock the managed device 404 that was locked at bock 504. While not described herein in detail, one of skill in the art in possession of the present disclosure will recognize how an encrypted device locking key may be decrypted to provide a device locking key, as well as how a device locking key may be used to unlock a managed device that was previously locked using that device locking key.

One of skill in the art in possession of the present disclosure will appreciate how encrypted device locking keys and/or encrypted key bundles stored by the second remote access controller engines/devices may be updated using substantially the same techniques discussed above. For example, when an encrypted device locking key or encrypted key bundle requires an update (e.g., due to a new device locking key being allocated for a managed device by the key management system 202), the first remote access controller engine provided by the remote access controller device included in the server device that houses the managed device may receive the device locking key, encrypt that device locking key to provide an encrypted device locking key, and broadcast a request to update the encrypted device locking key (or encrypted key bundle) along with the associated identifiers, which causes the second remote access controller engines to update the encrypted device locking key or encrypted key bundle in substantially the same manner as described above for the storage of the encrypted device locking key/encrypted key bundle. Similarly, when an encrypted device locking key or encrypted key bundle requires an update (e.g., due to a new device locking key being allocated for a managed device by the key management system 202), the first remote access controller engine provided by the remote access controller device included in the server device that houses the managed device may receive the device locking key, encrypt that device locking key to provide an encrypted device locking key, and broadcast a blockchain transaction that causes the smart contract to update the encrypted device locking key (or encrypted key bundle) along with the associated identifiers in substantially the same manner as described above for the storage of the encrypted device locking key/encrypted key bundle via the blockchain.

Thus, systems and methods have been described that provide for redundant key management of device locking keys used to secure managed devices in a datacenter without the need to provide a second/backup/redundant key management system in that datacenter. In some embodiments, remote access controller devices in server devices that include the managed device(s) operate in cooperation to provide redundant key management for each other, and in the event of the unavailability of the primary key management system in the datacenter, provide device locking keys to each other in order to allow the managed device(s) to be unlocked. For example, a first remote access controller device that has locked a managed device with a device locking key may broadcast a request to second remote access controller devices to store an encrypted version of the device locking key and, in response to an acceptance of the request, the first remote access controller device may then erase the encrypted device locking key (which is now stored by one or more of the second remote access controller devices.) Subsequently, in the event the primary key management system becomes unavailable when the managed device is to be unlocked, the first remote access controller device may retrieve the encrypted device unlocking key from any of the second remote access controller device(s) that stored it, decrypt it, and use the resulting device unlocking key to unlock the managed device. In other examples, a first remote access controller device that has locked a managed device with a device locking key may broadcast an encrypted version of the device locking key as part of a first blockchain transaction that causes the encrypted device locking key to be stored on the blockchain. Subsequently, in the event the primary key management system becomes unavailable when the managed device is to be unlocked, the first remote access controller device may broadcast a second blockchain transaction that causes the encrypted device locking key to be transmitted to the first remote access controller device for use in unlocking the managed device. As such, redundant key management is provided by one or more server device in a datacenter that may include the managed devices that are unlocked using the device locking keys under management, which eliminates the need to provide a secondary, backup, redundant, and rarely used, key management system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A redundant key management system, comprising:
a network;
a key management system that is coupled to the network and configured to generate a device locking key and transmit that key through the network; and
a first server device that is coupled to the network, wherein the first server device includes:
a managed device; and
a first remote access controller device that is coupled to the managed device, that operates independently of an operating system included on the first server device, that uses a first dedicated out-of-band
network connection to the network that is separate from an in-band network connection used by the operating system, and that is configured to:
receive, through the network from the key management system, a device locking key;
lock, using the device locking key, the managed device;
encrypt the device locking key to provide an encrypted device locking key;
broadcast, through the network to a plurality of second remote access controller devices provided in respective second server devices, the encrypted device locking key as part of a first blockchain
transaction that is directed to a blockchain address that is associated with a smart contract on a blockchain that is maintained by the first remote access controller device and the plurality of second
remote access controller devices,
wherein each of the plurality of second remote access controller devices:
operates independently of a respective operating system included on the respective second server device in which that second remote access controller device is provided; and
uses a respective second dedicated out-of-band network connection to the network that is separate from a respective in-band network connection used by the respective operating system included on the respective second server device in which that second remote access controller device is provided, and wherein one of the plurality of second remote access controller devices is configured to
process the first blockchain transaction to cause the smart contract to execute and store the encrypted device locking key on the blockchain;
erase, subsequent to broadcasting the device locking key, the encrypted device locking key;
transmit, subsequent to erasing the device locking key, a request to retrieve the encrypted device locking key as part of a second blockchain transaction that is directed to the blockchain address that is
associated with the smart contract, wherein one of the plurality of second remote access controller devices is configured to process the second blockchain transaction to cause the smart contract to
execute and transmit the encrypted device locking key to the first remote access controller device;
receive, through the network from the at least one of the plurality of second remote access controller devices in response to transmitting the request to retrieve the device locking key, the encrypted device locking key;
decrypt the encrypted device locking key to provide the device locking key; and use the device locking key to unlock the managed device.

2. The system of claim 1, wherein the first remote access controller device is configured to:
broadcast, through the network to the plurality of second remote access controller devices, a request to store the encrypted device locking key;
receive, through the network from at least one of the plurality of second remote access controller devices, an acceptance to store the encrypted device locking key; and
transmit, through the network to the at least one of the plurality of second remote access controller devices in response to receiving the acceptance to the store the encrypted device locking key, the encrypted device locking key,
wherein the request to retrieve the encrypted device locking key is transmitted to the at least one of the plurality of second remote access controller devices to which the encrypted device locking key was transmitted.

3. The system of claim 2, wherein the first remote access controller device is configured to:
provide the encrypted device locking key along with a first remote access controller device identifier as part of a key bundle; and
transmit, through the network to the at least one of the plurality of second remote access controller devices in response to receiving the acceptance to the store the encrypted device locking key, the key bundle.

4. The system of claim 3, wherein the first remote access controller device is configured to:
transmit first remote access controller device identification information along with the request to retrieve the encrypted device locking key, and wherein each of the at least one of the second remote access controller devices is configured to:
determine that the first remote access controller device identification information matches the first remote access controller device identifier and, in response, transmit the encrypted device locking key to the first remote access controller device.

5. The system of claim 3, wherein the first remote access controller device is configured to:
receive, through the network the at least one of the plurality of second remote access controller devices in response to transmitting the key bundle, respective second remote access controller device identifiers;
store the respective second remote access controller device identifiers;
determine, subsequent to storing the respective second remote access controller device identifiers, that the managed devices requires unlocking; and
transmit, using the respective second remote access controller device identifiers, the request to retrieve the encrypted device locking key to second remote access controller devices identified by the second remote access controller device identifiers.

6. The system of claim 1, wherein the processing of the first blockchain transaction causes the smart contract to execute and store the encrypted device locking key on the blockchain in a hash table included in the smart contract.

7. An Information Handling System (IHS), comprising:
a first processing system; and
a first memory system that is coupled to the first processing system and that includes instructions that, when executed by the first processing system, cause the first processing system to provide a remote access controller engine that operates independently of an operating system that is provided by a second processing system executing instructions included on a second memory system in the IHS, and that is configured to:
receive, through a network from a key management system via a first dedicated out-of-band network connection that is separate from an in-band network connection used by the operating system, a device locking key;
lock, using the device locking key, a managed device;
encrypt the device locking key to provide an encrypted device locking key;
broadcast, through the network to a plurality of remote access controller devices provided in respective server devices, the encrypted device locking key as part of a first blockchain transaction that is directed to a blockchain address that is associated with a smart contract on a blockchain that is maintained by the remote access controller engine and the plurality of remote access controller devices, wherein each of the plurality of remote access controller devices:
operates independently of a respective operating system included in the respective server device in which that remote access controller device is provided; and
uses a respective second dedicated out-of-band network connection to the network that is separate from a respective in-band network connection used by the respective operating system included on the respective server device in which that remote access controller device is provided, and wherein one of the plurality of remote access controller devices is configured to process the first blockchain transaction to cause the smart contract to execute and store the encrypted device locking key on the blockchain;
erase, subsequent to broadcasting the device locking key, the encrypted device locking key;
transmit, subsequent to erasing the device locking key, a request to retrieve the encrypted device locking key as part of a second blockchain transaction that is directed to the blockchain address that is associated with the smart contract, wherein one of the plurality of remote access controller devices is configured to process the second blockchain transaction to cause the smart contract to execute and transmit the encrypted device locking key to the remote access controller engine;
receive, through the network from the at least one of the plurality of remote access controller devices in response to transmitting the request to retrieve the device locking key, the encrypted device locking key;
decrypt the encrypted device locking key to provide the device locking key; and use the device locking key to unlock the managed device.

8. The IHS of claim 7, wherein the remote access controller engine is configured to:
   broadcast, through the network to the plurality of remote access controller devices, a request to store the encrypted device locking key;
   receive, through the network from at least one of the plurality of remote access controller devices, an acceptance to store the encrypted device locking key; and
   transmit, through the network to the at least one of the plurality of remote access controller devices in response to receiving the acceptance to the store the encrypted device locking key, the encrypted device locking key,
   wherein the request to retrieve the encrypted device locking key is transmitted to the at least one of the plurality of remote access controller devices to which the encrypted device locking key was transmitted.

9. The IHS of claim 8, wherein the remote access controller engine is configured to:
   provide the encrypted device locking key along with a first remote access controller engine identifier as part of a key bundle; and
   transmit, through the network to the at least one of the plurality of remote access controller devices in response to receiving the acceptance to the store the encrypted device locking key, the key bundle.

10. The IHS of claim 9, wherein the remote access controller engine is configured to:
    transmit remote access controller engine identification information along with the request to retrieve the encrypted device locking key, and wherein each of the at least one of the remote access controller devices is configured to:
       determine that the remote access controller engine identification information matches the remote access controller engine identifier and, in response, transmit the encrypted device locking key to the remote access controller engine.

11. The IHS of claim 9, wherein the remote access controller engine is configured to:
    receive, through the network the at least one of the plurality of remote access controller devices in response to transmitting the key bundle, respective remote access controller device identifiers;
    store the respective remote access controller device identifiers;
    determine, subsequent to storing the respective remote access controller device identifiers, that the managed devices requires unlocking; and
    transmit, using the respective remote access controller device identifiers, the request to retrieve the encrypted device locking key to remote access controller devices identified by the remote access controller device identifiers.

12. The IHS of claim 7, wherein the processing of the first blockchain transaction causes the smart contract to execute and store the encrypted device locking key on the blockchain in a hash table included in the smart contract.

13. The IHS of claim 7, wherein the smart contract is configured to store, on the blockchain, information about the transmission of the encrypted locking key to the remote access controller engine.

14. A method for redundant key management, comprising:
    receiving, by a first remote access controller device in a first server device through a network from a key management system, a device locking key, wherein the first remote access controller device operates independently of an operating system included on the first server device, and uses a first dedicated out-of-band network connection to the network that is separate from an in-band network connection used by the operating system;
    locking, by the first remote access controller device using the device locking key, a managed device;
    encrypting, by the first remote access controller device, the device locking key to provide an encrypted device locking key;
    broadcasting, by the first remote access controller device through the network to a plurality of second remote access controller devices provided in respective second server devices, the encrypted device locking key as part of a first blockchain transaction that is directed to a blockchain address that is associated with a smart contract on a blockchain that is maintained by the first remote access controller device and the plurality of second remote access controller devices, wherein each of the plurality of second remote access controller devices:
       operates independently of a respective operating system included on the respective second server device in which that second remote access controller device is provided; and
       uses a respective second dedicated out-of-band network connection to the network that is separate from a respective in-band network connection used by the respective operating system included on the respective second server device in which that second remote access controller device is provided, and wherein one of the plurality of second remote access controller devices is configured to process the first blockchain transaction to cause the smart contract to execute and store the encrypted device locking key on the blockchain;
    erasing, by the first remote access controller device subsequent to broadcasting the device locking key, the encrypted device locking key;
    transmitting, by the first remote access controller device subsequent to erasing the device locking key, a request to retrieve the encrypted device locking key as part of a second blockchain transaction that is directed to the blockchain address that is associated with the smart contract, wherein one of the plurality of second remote access controller devices is configured to process the second blockchain transaction to cause the smart contract to execute and transmit the encrypted device locking key to the first remote access controller device;
    receiving, by the first remote access controller device through the network from the at least one of the plurality of second remote access controller devices in response to transmitting the request to retrieve the device locking key, the encrypted device locking key;
    decrypting, by the first remote access controller device, the encrypted device locking key to provide the device locking key; and
    using, by the first remote access controller device, the device locking key to unlock the managed device.

15. The method of claim 14, further comprising:
    broadcasting, by the first remote access controller device through the network to the plurality of second remote access controller devices, a request to store the encrypted device locking key;

receiving, by the first remote access controller device through the network from at least one of the plurality of second remote access controller devices, an acceptance to store the encrypted device locking key; and transmitting, by the first remote access controller device through the network to the at least one of the plurality of second remote access controller devices in response to receiving the acceptance to the store the encrypted device locking key, the encrypted device locking key, wherein the request to retrieve the encrypted device locking key is transmitted to the at least one of the plurality of second remote access controller devices to which the encrypted device locking key was transmitted.

16. The method of claim 15, further comprising:

providing, by the first remote access controller device, the encrypted device locking key along with a first remote access controller device identifier as part of a key bundle; and transmitting, by the first remote access controller device through the network to the at least one of the plurality of remote access controller devices in response to receiving the acceptance to the store the encrypted device locking key, the key bundle.

17. The method of claim 16, further comprising:

transmitting, by the first remote access controller device, first remote access controller device identification information along with the request to retrieve the encrypted device locking key, and wherein each of the at least one of the second remote access controller devices is configured to:

determine that the first remote access controller device identification information matches the first remote access controller device identifier and, in response, transmit the encrypted device locking key to the first remote access controller device.

18. The method of claim 16, further comprising:

receiving, by the first remote access controller device through the network the at least one of the plurality of second remote access controller devices in response to transmitting the key bundle, respective second remote access controller device identifiers;

storing, by the first remote access controller device, the respective second remote access controller device identifiers;

determining, by the first remote access controller device subsequent to storing the respective second remote access controller device identifiers, that the managed devices requires unlocking; and transmitting, by the first remote access controller device using the respective second remote access controller device identifiers, the request to retrieve the encrypted device locking key to second remote access controller devices identified by the second remote access controller device identifiers.

19. The method of claim 14, wherein the processing of the first blockchain transaction causes the smart contract to execute and store the encrypted device locking key on the blockchain in a hash table included in the smart contract.

20. The method of claim 14, wherein the smart contract is configured to store, on the blockchain, information about the transmission of the encrypted locking key to the first remote access controller device.

* * * * *